UNITED STATES PATENT OFFICE.

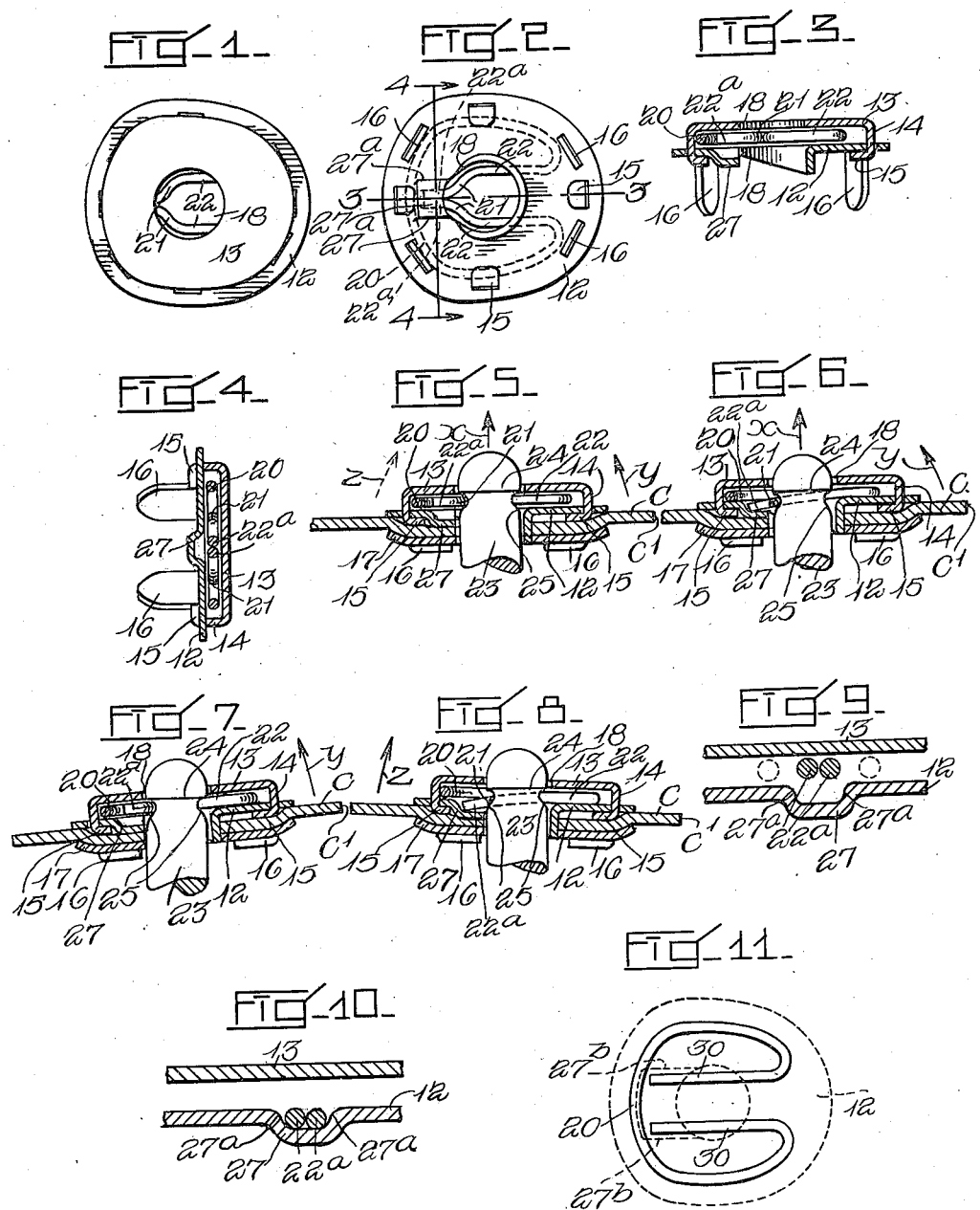

ANDREW G. ANDERSON, OF BOSTON, MASSACHUSETTS, ASSIGNOR TO CARR FASTENER COMPANY, OF CAMBRIDGE, MASSACHUSETTS, A CORPORATION OF MAINE.

STUD-AND-SOCKET FASTENER.

1,268,665. Specification of Letters Patent. Patented June 4, 1918.

Application filed June 26, 1916. Serial No. 105,822.

*To all whom it may concern:*

Be it known that I, ANDREW G. ANDERSON, a citizen of the United States, residing at Boston, in the county of Suffolk and State of Massachusetts, have invented new and useful Improvements in Stud-and-Socket Fasteners, of which the following is a specification.

This invention relates to a fastener for carriage curtains and the like and comprises a stud member attached to one of two parts to be connected and a socket member attached to the other of said parts. The stud member is usually attached to a relatively rigid or inflexible part, and the socket member to a flexible part such as a curtain, although the invention is not limited in this respect.

A fastener of the general type to which the invention relates is shown by the Carr Patent No. 1,038,288, dated September 10, 1912. The members of said fastener are provided with complemental interengaging parts adapted to coöperate in preventing separation of the members excepting by a movement, in a predetermined direction, of one member relatively to the other, the object being to prevent liability of accidental separation of the members, and so construct them that their separation is practicable only by a movement of one part relatively to the other not likely to be caused by accident.

In the fastener of the Carr patent the socket member includes a pair of spring-yielding jaws hereinafter referred to as resilient members, and a casing or holder in which said jaws are movable, while the stud member is a cylindrical post having an annular inwardly facing shoulder. Said jaws and shoulder constitute the interengaging parts above referred to and are formed to strongly resist or prevent separation of the members by such movements of one relatively to the other as are liable to be accidentally caused, and to permit free separation by a predetermined movement the direction of which is such that it is not liable to be caused accidentally.

In accordance with the present invention I utilize the holder portion of the socket member as an element of the means for preventing accidental separation of the two members by so forming said holder that under certain conditions it positively locks the jaws in practically inseparable engagement with the stud member, and under other conditions offers no resistance to the separation of the jaws from the stud.

The invention is embodied in the improvements hereinafter described and claimed.

Of the accompanying drawings forming a part of this specification:

Figure 1 represents a front view of a suitable form of socket member;

Fig. 2 represents a back view of the same;

Fig. 3 represents a section on line 3—3 of Fig. 2;

Fig. 4 represents a section on line 4—4 of Fig. 2;

Figs. 5, 6, 7 and 8 represent the socket and stud members differently related, the one in section and the other in elevation;

Figs. 9 and 10 represent enlargements of a portion of Fig. 4, showing the jaws in different positions;

Fig. 11 represents a side view of a modified form of the resilient member which includes the two stud-engaging jaws.

The same reference characters indicate the same or similar parts in all the views.

The casing or holder portion of the socket member includes a back plate 12 and a front plate or top 13 having a marginal flange 14 which bears on the back plate and is preferably attached thereto by ears 15 formed on the flange, passed through slots in the back plate, and clenched on the inner side of the latter. The flange is also preferably provided with elongated ears or prongs 16, which are passed through slots in the back through a curtain *c* on the outer side of which the back is placed, and through slots in a clamping plate 17 placed on the inner side of the curtain, the prongs 16 being clenched on the clamping plate, as shown by Fig. 6.

Each of the plates 12, 13 and 17 is provided with a substantially central circular opening 18, said openings being alined and forming, in effect, an aperture through the holder for the reception of the stud member.

The top 13 and the back 12 constitute the closely spaced sides of a chamber the margin of which is formed by the flange 14. Said chamber contains a resilient wire member which preferably includes a looped portion 20 and spring-yielding jaws, hereinafter referred to as resilient members, formed by bending the end portions of the wire blank from which said member is made, into the looped portion. In the preferred embodiment of the invention the said jaws are provided with segmental portions 21 and with substantially parallel portions 22 coöperating with the stud member, substantially as described in the above-mentioned Carr patent.

The stud member 23 is cylindrical and provided with suitable means (not shown) for attachment to the part which carries it. The outer end of the stud is rounded to permit it to pass freely through the various openings forming the aperture through the holder. The stud is provided with a peripheral groove adjacent to its rounded outer end, the outer side of said groove forming an inwardly facing annular shoulder 24 and its inner side forming an outwardly facing annular shoulder 25.

As shown by Figs. 1 and 2, the resilient jaws are arranged to project normally into the aperture through the holder. When the stud is inserted in said aperture, the jaws are first forced apart by the rounded outer end of the stud, and then spring into the groove and engage the inwardly facing shoulder 24, the segmental portions 21 bearing on a considerable portion of said shoulder, while the portions 22 extend tangentially from the stud so that, as described in the Carr patent, the segmental portions coöperate with a portion of the inwardly facing shoulder in opposing a direct outward movement of the socket member in the direction of the arrow $x$, and a tipping movement in the direction of the arrow $z$.

As further described in the Carr patent, the tangential portions 22 are adapted to be forced apart when the socket member is tipped in the direction of the arrow $y$, a part of the shoulder 24 acting as a wedge to separate the portions 22, and with them the segmental portions 21, until the jaws are disengaged from the stud.

As thus far described the construction and operation are substantially the same as described in the said Carr patent, the means opposing various movements of the socket, relatively to the stud, and permitting a movement in a predetermined direction being embodied in the annular inwardly facing shoulder 24, and in the jaws having the portions 21 and 22.

In accordance with the present invention I have provided the holder portion of the socket member with means for positively engaging and locking the jaws and thus preventing their separation and their disengagement from the stud member, either by a rectilinear movement of the socket member in the direction of arrow $x$, or by a tipping movement in the direction of arrow $z$.

To this end I provide a suitable portion of the holder, and preferably the back 12, with jaw-engaging means embodied, as here shown, in an offset portion or depression 27 forming a part of the back, the edges $27^a$ of said depression forming opposed abutments adapted to engage the extremities of the jaws and prevent the jaws from moving away from each other. Said depression is located at the side of the stud-receiving orifice 18 farthest from the free edge $c'$ of the curtain $c$, $c'$ being the edge which is lifted in tipping the socket member in the direction of arrow $y$. The open end of the depression 27 forms a part of the wall of said orifice, so that the depression is in alinement with and opens into the orifice. The abutments $27^a$ are substantially parallel with the extremities $22^a$ of the jaws and are so spaced apart that when the said extremities are moved by flexure of the jaws into the depression, as shown by Fig. 10, the abutments prevent movement of the jaws away from each other and therefore positively lock the jaws in engagement with the stud 23.

The jaws are normally held by their own resilience above the depression, as shown by Figs. 5, 7 and 9, so that they are normally free to move in the paths indicated by full and dotted lines in Fig. 9, the full lines indicating the positions of the jaws when they are engaged with the stud, and the dotted lines indicating their positions when they are separated to release their hold on the stud.

It will now be seen that when the socket member is moved in the direction of arrow $x$ from the position shown by Fig. 5 to that shown by Fig. 6, this being a rectilinear outward movement, the shoulder 24 causes a flexure of the jaws and forces their extremities into the depression, as shown by Figs. 6 and 10, so that the jaws are positively locked against disengagement from the shoulder 24.

The same result is produced by strain tending to tip the socket member in the direction of the arrow $z$, as shown by Fig. 8, the bearing of the segmental jaw portions 21 on a portion of the shoulder 24 causing a flexure of the jaws.

When however the socket member is tipped in the direction of arrow $y$, as shown by Fig. 7, the extremities of the jaws remain unflexed, another portion of the shoulder 24 bearing on the tangential jaw portions 22 and moving the same apart. Incidentally a portion of the inner stud shoulder 25 exerts pressure on the jaws, tending to press their extremities $22^a$ against the holder top 13.

As indicated by Fig. 11, the resilient member may have substantially straight jaws 30, the extremities of which are more widely separated than those of the jaws above described. In this modification the abutments 27ᵇ, indicated by dotted lines, are more widely spaced apart than the abutments 27ᵃ, otherwise the construction may be the same as that previously described.

Having described my invention, I claim:

1. A fastener having, in combination, a socket member including an apertured holder and resilient jaws located within said holder and exposed in the aperture thereof, and a stud adapted to be inserted in said holder between said jaws and to oppositely displace the latter, and having an inwardly facing shoulder adapted to engage said jaws, the stud and jaws being formed to coöperate in opposing displacement of the jaws by strain tending to cause a rectilinear outward movement of the socket member, and in causing displacement of the jaws by strain tending to tip the socket member in a predetermined direction, and the holder being provided with means permitting inward flexure of the jaws and positively locking the jaws when they are thus flexed.

2. A fastener having, in combination, a socket member including an apertured holder and resilient jaws located within said holder and exposed in the aperture thereof, and a stud adapted to be inserted in said holder between said jaws and to oppositely displace the latter, and having an inwardly facing shoulder adapted to engage said jaws, the stud and jaws being formed to coöperate in opposing displacement of the jaws by strain tending to cause a rectilinear outward movement of the socket member, and in causing displacement of the jaws by strain tending to tip the socket member in a predetermined direction, and the holder being provided with a depression permitting inward flexure of the jaws, and having abutments which positively lock the jaws when they are thus flexed.

3. A fastener having, in combination, a socket member including an apertured holder and resilient jaws located within said holder and exposed in the aperture thereof, and a stud adapted to be inserted in said holder between said jaws and to oppositely displace the latter, and having an inwardly facing shoulder adapted to engage said jaws, the stud and jaws being formed to coöperate in opposing displacement of the jaws by strain tending to cause either a rectilinear outward movement, or a tipping movement in one direction of the socket member and in causing displacement of the jaws by strain tending to cause a tipping movement in a different direction and the holder being provided with means permitting inward flexure of the jaws and positively locking the jaws when they are thus flexed.

4. A fastener having, in combination, a socket member including an apertured holder and resilient jaws located within said holder and having segmental portions and tangential portions exposed in the aperture of the holder, and a stud adapted to be inserted in said holder between said jaws and to oppositely displace the latter, and having an annular inwardly facing shoulder adapted to engage the segmental and tangential portions of said jaws and to coöperate therewith as described in opposing rectilinear outward movement and a tipping movement in one direction, of the socket member, and in permitting a tipping movement of the socket member in a different direction, the holder being provided with means permitting inward flexure of the jaws, and positively locking the jaws when they are thus flexed.

5. A fastener having, in combination, a socket member including an apertured holder and resilient jaws located within said holder and having segmental portions and tangential portions exposed in the aperture of the holder, and a stud adapted to be inserted in said holder between said jaws and to oppositely displace the latter, and having an annular inwardly facing shoulder adapted to engage the segmental and tangential portions of said jaws and to coöperate therewith as described in opposing rectilinear outward movement and a tipping movement in one direction, of the socket member, and in permitting a tipping movement of the socket member in a different direction, the holder being provided with a depression permitting inward flexure of the jaws, and having abutments which positively lock the jaws when they are thus flexed.

6. A fastener having, in combination, a pair of resilient members yieldingly disposed in contracted relation with respect to each other, a holder for said members having a depression constructed and arranged to receive the free ends of said members, a stud adapted to be inserted in said holder between said resilient members, and a shoulder on said stud adapted to be engaged by said resilient members when pressure is applied to said holder longitudinally of said stud in one direction, to force the free ends of said resilient members into said depression, whereby said members will be held contracted and the removal of said holder from said stud be prevented.

7. A fastener having, in combination, a pair of resilient members arranged with their free ends normally substantially in contact with each other, a holder for said members having an aperture extending therethrough, said holder also having a depression arranged in alinement with the free ends of said resilient members, a stud adapted to be inserted into the aperture in said holder between said resilient members, and a shoulder formed upon said stud adapted to be engaged by said resilient members when pressure is applied to said holder longitudinally of said stud in one direction, to force the free ends of said resilient members into said depression, whereby said resilient members will be positively locked together and the removal of said holder from said stud prevented.

8. A fastener having, in combination, a holder provided with an aperture, said holder also having a depression at one side of said aperture, a resilient member arranged within said holder, encircling said aperture, the end portions of said resilient member being arranged, transversely of said aperture, the extremities of said end portions being arranged to normally aline with said depression, a stud adapted to be inserted in said aperture between the end portions of said resilient member, and a shoulder on said stud adapted to be moved to engage said end portions and move the same into said depression to positively hold said end portions in normal relation, whereby the withdrawal of said stud from said holder will be prevented.

9. A fastener having, in combination, a holder provided with a centrally disposed aperture, said holder also having a depression on one side of said aperture, a resilient member arranged within said holder, the end portions of said resilient member being arranged, transversely of said aperture, the extremities of said end portions being normally yieldingly held in contracted relation and in alinement with said depression, and a cylindrical stud adapted to be inserted in said aperture between the end portions of said resilient member, said stud having an annular groove formed adjacent to the extremity thereof, adapted to receive said end portions, said annular groove forming a shoulder constructed and arranged to engage said end portions and force the extremities thereof into said depression when attempt is made to withdraw said stud from said holder in a direction longitudinal of said stud, whereby the extremities of said end portions will be positively held contracted and the withdrawal of said stud prevented.

10. A fastener having, in combination, a holder including a top, a back secured to said top, said top and said back having apertures extending therethrough substantially in alinement with each other, a resilient member arranged within said holder intermediate of said top and said back, the end portions of said resilient member being arranged transversely of said apertures and in normally yieldingly contracted relation, said back also having a depression formed therein at one side of said aperture and alining with the extremities of said end portions, a stud adapted to be inserted in said casing between said end portions, and a shoulder formed upon said stud constructed and arranged to engage said end portions and force the extremities thereof into said depression, whereby said stud will be firmly gripped and the withdrawal thereof prevented.

11. A fastener having, in combination, a holder provided with an aperture, a pair of abutments on said holder at one side of said aperture, a pair of resilient members arranged transversely of said holder over said aperture with the free ends of said resilient members substantially alining with said abutments, a stud adapted to be inserted through said aperture between said resilient members, and a shoulder on said stud constructed and arranged to engage said resilient members and move the extremities thereof against said abutments, whereby said resilient members will be held contracted to prevent the withdrawal of said stud from said aperture.

12. A fastener having, in combination, a holder provided with an aperture adapted to receive a stud, a pair of resilient members arranged within said holder transversely of said aperture, said resilient members being normally movable toward and away from each other, a stud adapted to be inserted in said aperture between said resilient members, said stud having an annular groove formed adjacent to one end thereof, the edge of said groove farthest from said end being rounded and adapted to engage and spread said resilient members, and means on said holder outside of the normal path of movement of said resilient members adapted to be engaged by said resilient members and prevent the spreading thereof.

13. A fastener having, in combination, a holder provided with an aperture, a resilient member arranged within said holder and normally movable transversely of said aperture, a stud adapted to be inserted in said aperture, said stud having a shoulder constructed and arranged to be engaged by said resilient member, and means on said holder arranged outside of the normal path of movement of said resilient member adapted to be engaged by said resilient member to prevent the disengagement of said resilient member from said shoulder.

14. A fastener comprising a holder consisting of two substantially parallel walls separated by a space, said holder having a stud-receiving aperture, a pair of resilient members arranged between the walls of said casing and transversely of said aperture, the free ends of said resilient members being normally movable toward and away from each other, a stud adapted to be inserted in said aperture between said resilient members, said stud having a shoulder adapted to be engaged by said resilient members, and means on said holder outside of the normal paths of movement of said resilient members constructed and arranged to be engaged by said resilient members when the same are deflected from their normal paths to prevent the movements of said members away from each other.

15. A fastener comprising a holder consisting of two substantially parallel walls separated by a space, said holder having a stud-receiving aperture, a pair of resilient members arranged between the walls of said casing and transversely of said aperture, said resilient members being substantially the equivalent in thickness to the space between said walls, a stud adapted to be inserted in said aperture between said resilient members, said stud having a shoulder adapted to be engaged by said resilient members, and means on said holder outside of the normal paths of movement of said resilient members constructed and arranged to be engaged by said resilient members when the same are deflected from their normal paths to prevent the movements of said members away from each other.

In testimony whereof I have affixed my signature.

ANDREW G. ANDERSON.